United States Patent [19]

Cook et al.

[11] 4,386,629
[45] * Jun. 7, 1983

[54] APPARATUS FOR INTERNAL PIPE PROTECTION

[75] Inventors: Paul M. Cook, Menlo Park; Richard F. Otte, Los Altos Hills; James L. Claypool, Mountain View; Lawrence J. White, San Jose; Harry C. Broyles, Sunnyvale; Peter L. Brooks, Los Altos, all of Calif.

[73] Assignee: Raychem Corporation, Menlo Park, Calif.

[*] Notice: The portion of the term of this patent subsequent to Oct. 26, 1999, has been disclaimed.

[21] Appl. No.: 279,631

[22] Filed: Jul. 7, 1981

Related U.S. Application Data

[63] Continuation-in-part of Ser. No. 174,304, Jul. 31, 1980, Pat. No. 4,355,664.

[51] Int. Cl.³ .............................................. F16L 9/14
[52] U.S. Cl. ..................................... 138/110; 138/98; 138/103; 138/178; 138/DIG. 6; 428/36; 428/913; 156/83; 156/86; 156/87
[58] Field of Search ................... 138/89, 97, 98, 99, 138/103, 110, 137, 140, 178, 141, 145, DIG. 6, 146, 177; 428/35, 36, 913; 264/230, 269; 29/447, 523; 174/DIG. 8; 156/83, 84, 294, 322, 321

[56] References Cited

U.S. PATENT DOCUMENTS

| 150,840 | 5/1880 | Holmes . |
| 2,415,912 | 2/1947 | Scherl . |
| 3,135,047 | 6/1964 | Houser . |
| 3,415,544 | 12/1968 | Hucks, Jr. . |
| 3,429,954 | 2/1969 | Atkins et al. ...................... 138/177 |
| 3,508,766 | 3/1970 | Kessler et al. . |
| 3,758,361 | 9/1973 | Hunter . |
| 3,770,556 | 11/1973 | Evans et al. . |
| 3,799,584 | 3/1974 | Slocum . |
| 3,817,805 | 6/1974 | Surikov . |
| 3,890,483 | 6/1975 | Webster . |
| 3,915,478 | 10/1975 | Al et al. . |
| 3,965,555 | 6/1976 | Webster . |
| 3,968,552 | 7/1976 | Hunter . |
| 4,026,583 | 5/1977 | Gottlieb . |
| 4,042,559 | 8/1977 | Abelson et al. . |
| 4,135,553 | 1/1979 | Evans et al. ................. 138/178 X |
| 4,197,880 | 4/1980 | Cordia . |
| 4,295,494 | 10/1981 | McGowan et al. .................. 138/89 |

FOREIGN PATENT DOCUMENTS

| 7415374 | 11/1979 | Australia . |
| 2370225 | 6/1978 | France . |
| 2438788 | 5/1980 | France . |
| 1116879 | 6/1968 | United Kingdom . |
| 1554431 | 10/1979 | United Kingdom . |

Primary Examiner—James E. Bryant, III
Attorney, Agent, or Firm—James W. Peterson

[57] ABSTRACT

A device for providing a protective coating for the inside of pipes, said device being remotely actuated from outside said pipes. Specifically, the device comprises a high modulus engineering plastic delivery means, a corrosion resistant liner means, and a bonding means, said device expanding upon application of heat toward the inner wall of the pipe to cause the bonding means to flow progressively between the liner means and the inside of the pipe to thereby preclude air entrapment and to bond said liner means to the inside of the pipe.

8 Claims, 17 Drawing Figures

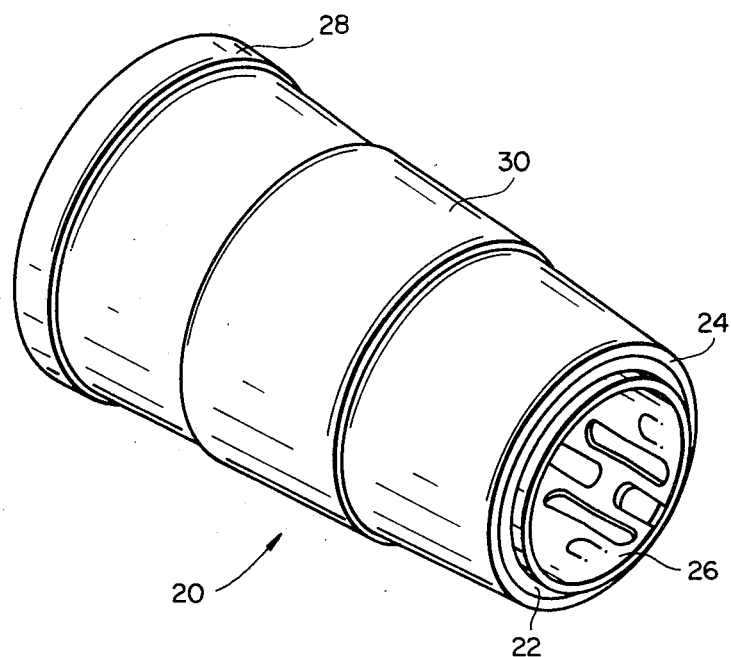
FIG_1
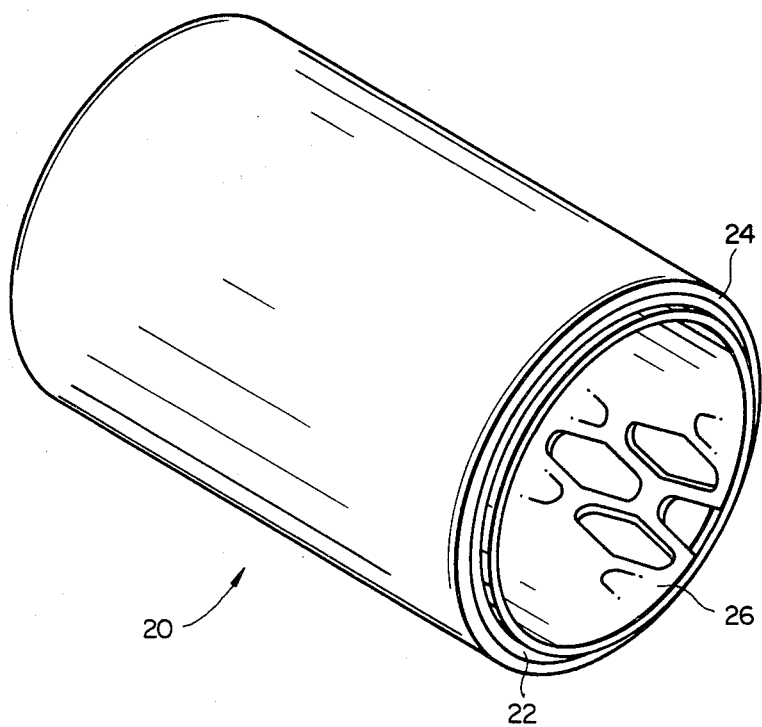
FIG_2

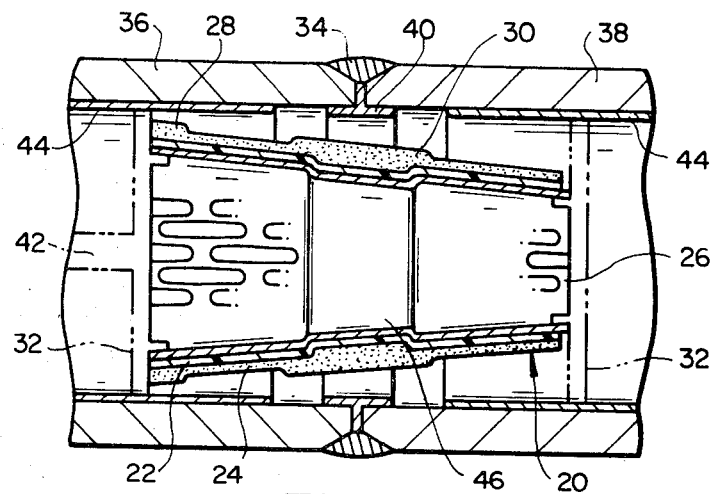
FIG_3
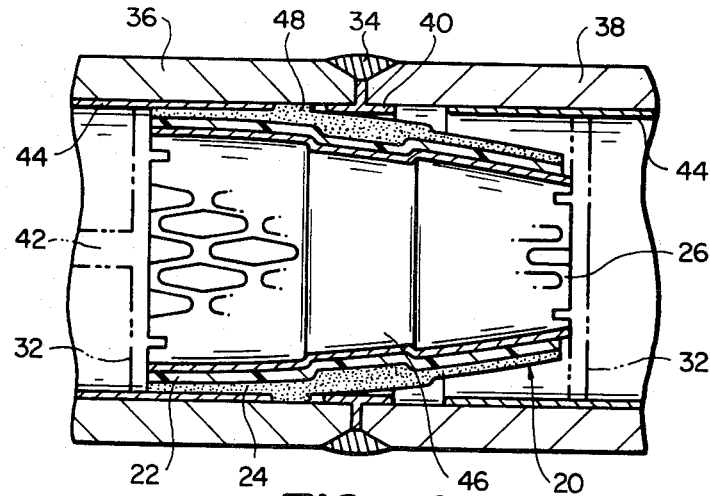
FIG_4
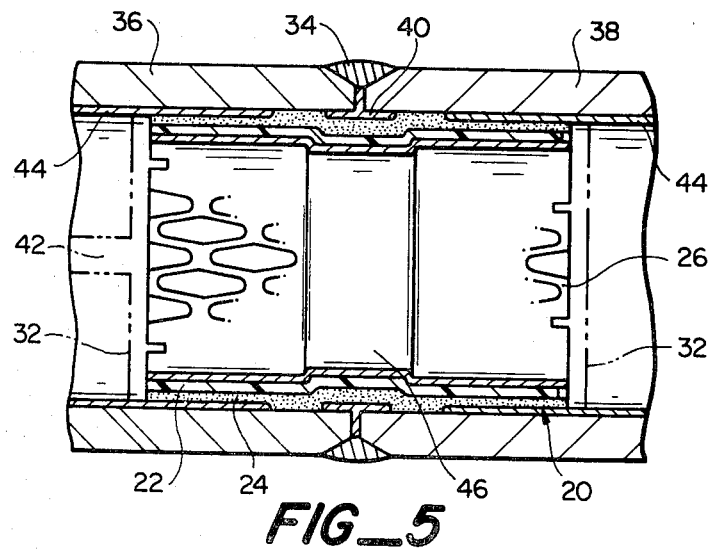
FIG_5

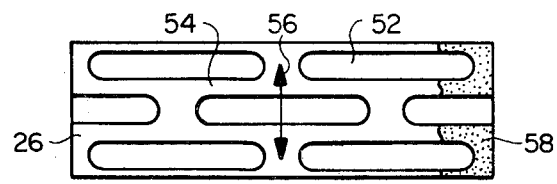
FIG_6
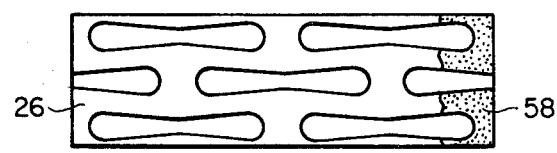
FIG_7
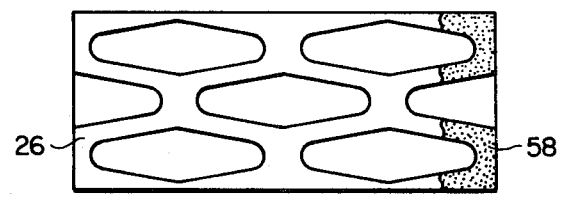
FIG_8
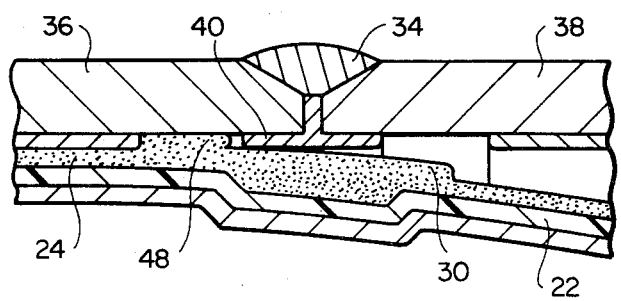
FIG_9
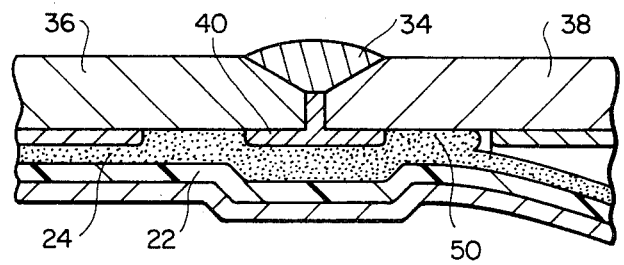
FIG_10

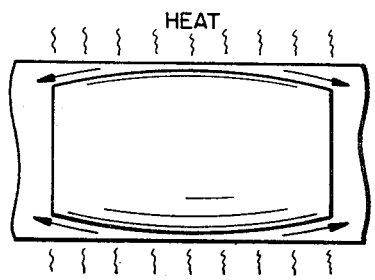
FIG_11
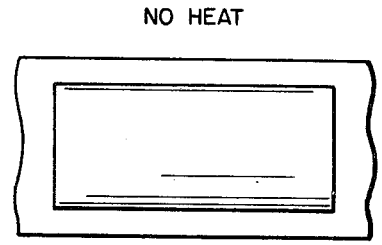
FIG_14
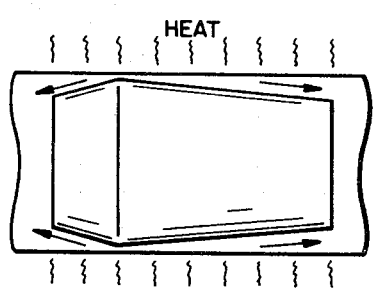
FIG_12
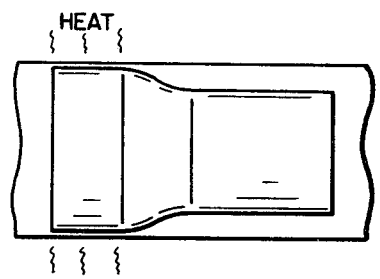
FIG_15
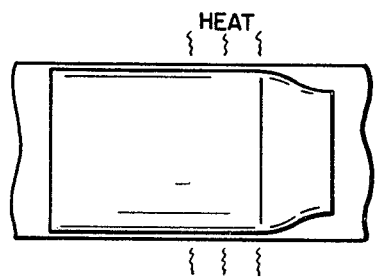
FIG_16
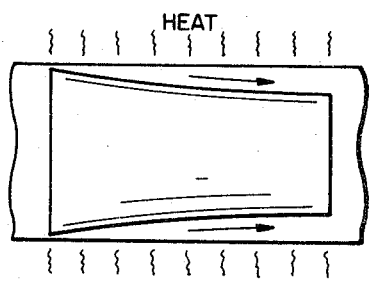
FIG_13
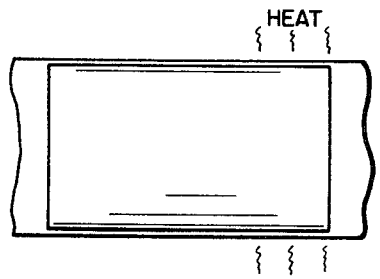
FIG_17

APPARATUS FOR INTERNAL PIPE PROTECTION

CROSS REFERENCE TO RELATED APPLICATION

This application is a continuation-in-part of our co-pending application, Ser. No. 174,304, filed July 31, 1980, now U.S. Pat. No. 4,355,664, the disclosure of which application is incorporated herein by reference.

BACKGROUND OF THE INVENTION

As a result of secondary recovery requirements in oil fields, hot, often saline and corrosive water containing a variety of impurities is pumped at high pressures into the ground to force the oil out. Although the pipes used in this process usually have interior protective plastic linings, the areas where the pipe sections have been welded together do not have such a lining and are subject to very high corrosion rates. In order to prevent corrosion in these weld areas, an internal pipe corrosion protection device has been developed.

The instant invention is a device which is placed in general position inside the pipe prior to the joining of two pipe sections and which, when located directly beneath the welded and internally exposed joint after the joint has been welded, expands by application of external heat wherein a high modulus engineering plastic delivery means expands radially so as to apply a corrosion-resistant liner means and heat activated bonding means to the inside of the pipe joint. The unique structure and configuration of the delivery means applies the linear means and the flowable bonding means progressively into intimate contact with the inside of the pipe wall to thereby prevent the formation of voids in said bonding means.

In the past, memory metals have been utilized in mechanical composite pipe couplings to force tensile load bearing members into gripping contact with pipes and tubing. Commonly assigned Australian Pat. No. 74153/74 to C. L. Martin discloses the use of such memory metal for drivers to be utilized externally and internally with respect to pipes to be joined to simultaneously force tensile load bearing members of various configurations into the exterior or interior surface of the pipes. Likewise, commonly assigned British Pat. No. 1,554,431 to C. L. Martin discloses the use of various configurations of memory metal alloy to secure patch members over ruptured pipe sections. These configurations may include the use of a polymeric coating for a gas tight seal. Commonly assigned U.S. Pat. No. 4,197,880, to J. M. Cordia discloses a compressed, axially slit, cylindrical memory metal driver member which is held in a radially compressed configuration by a thermoplastic retainer means, and is used to drive a foamable material toward the inside wall of a pipe.

None of the above described references suggest means to bond a chemically resistant liner to the inside of a pipe, especially in the area of a weld which is irregular in surface condition. The instant invention is unique in providing a highly expansible delivery means which progressively radially enlarges so as to apply a liner means and a flowable bonding means to smooth or irregular surfaces to preclude air entrapment, i.e. void areas, between said liner means and the inside of the pipe. Aside from the potential severe corrosion problems associated with any void areas, a major problem is encountered when a protectively lined pipe is pressurized and then later de-pressurized. Over time, any void in a pressurized pipe may become pressurized by the components in fluid in the pipe. When the pressure in the pipe is rapidly reduced the void can in essence explode, thereby damaging the integrity of the corrosion resistant liner. The configuration and articulation of the delivery means of the instant invention inherently causes a "pumping" wave of the bonding means, thereby bonding a chemically resistant liner means to the joint interior surface in a manner free of voids.

OBJECTS OF THE INVENTION

It is a primary object of the instant invention to provide a corrosion resistant internal pipe protection device for pipe joint weld areas.

It is another object of the instant invention to provide an internal pipe protection device which may be actuated from outside a pipe after the device is placed in the pipe.

It is yet another object of the instant invention to provide a liner means which may be applied to a roughened or irregular inside surface of a pipe to protect that area and compensate for its surface condition.

SUMMARY OF THE INVENTION

The purpose of the instant invention is to provide an internal pipe protection device which can be inserted into a pipe, said device being capable of expansion without hands-on or other direct contact with said protection device.

To accomplish this purpose, the instant invention provides the combination of delivery, liner, and bonding means wherein said corrosion resistant liner means softens upon heating and is deformable by the expandable cage-like tubular member of high modulus engineering plastic material forcing the corrosion resistant liner means toward the inside surface of the pipe causing the bonding means to flow progressively along internal pipe surface irregularities, thereby precluding entrapment of air.

DESCRIPTION OF THE DRAWING

FIG. 1 illustrates in perspective view the device of the instant invention before installation.

FIG. 2 illustrates in perspective view the device of the instant invention after it has been heated.

FIG. 3 illustrates in full section view the device of the instant invention placed within pipes to be protected before activation of the device.

FIG. 4 is a full cross-sectional view as in FIG. 3 during installation.

FIG. 5 is a full cross-sectional view of the device in FIGS. 3 and 4 after installation has been completed.

FIG. 6 is a planar view of a piece of the delivery means of the instant invention in its compressed or non-expanded condition.

FIG. 7 is a planar view of a piece of an alternate embodiment of the delivery means of the instant invention in its compressed or non-expanded condition.

FIG. 8 is a planar view of the delivery means illustrated in FIG. 6 in its recovered or expanded condition.

FIG. 9 is a partial cross-sectional view of the weld area of FIG. 4, illustrating a wave of bonding material being generated by the delivery means.

FIG. 10 is a partial cross-sectional view identical to FIG. 9 illustrating further progress of the bonding material.

FIG. 11 is a schematic cross-sectional view of a first alternate embodiment of the device illustrated in FIG. 3.

FIG. 12 is a schematic cross-sectional view of a second alternate embodiment of the device illustrated in FIG. 3.

FIG. 13 is a schematic cross-sectional view of a third alternate embodiment of the device illustrated in FIG. 3.

FIG. 14 is a schematic cross-sectional view of a fourth alternate embodiment of the device illustrated in FIG. 3.

FIGS 15 through 17 illustrate the use of programmed heating on the device shown in FIG. 14.

DESCRIPTION OF PREFERRED EMBODIMENT

With continued reference to the drawing, FIG. 1 illustrates generally at 20 the internal pipe protection device of the instant invention. Device 20 is comprised of liner means 22, bonding means 24 and delivery means 26. Delivery means 26 is a radially compressed, open, cage-like tubular member of high modulus engineering plastic. Delivery means 26 is contained radially by liner means 22. Upon application of heat liner means 22 softens and allows delivery means 26 to expand and recover in spring like fashion to force liner means 22 and bonding means 24 radially outwardly as can be more clearly seen in FIG. 2. FIGS. 1 and 2 illustrate the device of the instant invention before and after expansion without regard to alterations in the surface of bonding means 24 that would occur due to the internal configuration of a pipe in which the device 20 would be inserted. It is important to note in FIG. 1 that the device is frustro-conical in overall shape before heating and generally cylindrical in shape, as illustrated in FIG. 2, after heating. Specific details concerning bonding means 24 will be discussed later. Bonding means 24 may have a large amount of material placed at the large end of the device as noted at 28. Another large amount of material may be placed approximately midway along the length of the device as noted at 30. The additional amount of material at 30 is useful when the device is placed squarely under a welded pipe joint which inherently has surface irregularities seen in the figures and as will be discussed later.

It can also be seen in FIGS. 1 and 2 that the delivery means 26 may extend axially beyond the liner means and bonding means at the small end of the device. The reason for this extension is to prevent the liner means 22 which envelopes delivery means 26 from growing over the edge of the delivery means 26 as the device expands, since such growth would subject the liner means to splitting forces and could potentially obstruct flow through the installed internal pipe protection device 20. This problem will become more apparent after detailed discussion of the expansion of the internal pipe protection device.

FIG. 3 illustrates in cross-sectional view the device 20 of the instant invention held by positioning means 32 directly under girth weld 34 which joins pipe 36 to pipe 38. A back-up ring of "T" shaped cross-section has been used in the welding of pipe 36 to pipe 38 to prevent or at least reduce spattering of contamination from weld 34 into the inside of the pipes. Device 20 is moved to the vicinity of the weld area, after the intense heat associated with welding has dissipated, by positioning means 32. Positioning means 32, however, is not per se necessary for operation of the device 20 itself. The positioning means 32 shown is a pair of support discs and an axial member 42 which moves the device 20 from a position remote from the weld area to directly under the weld area when welding heat has dissipated. Positioning means 32 also acts as a heat shield to shield the device 20 from the heat of welding and as a windscreen to enhance the heating oven formed between the pipe and device 20 when external heat is used to recover said device. A particularly suitable positioning means is disclosed in the commonly assigned application of White, Ser. No. 174,289, filed July 31, 1980, the disclosure of which is incorporated by reference. It can be seen in FIGS. 3-5 that the pipes 36 and 38 are lined with corrosion-resistant material 44. It can also be seen in FIGS. 3-5 that delivery means 26 may have an annular detent region 46 which is used to reduce the force exerted by delivery means 26 on liner means 22 when the delivery means expands toward back-up ring 40.

FIG. 4 illustrates in partial cross-sectional view the device of FIG. 3 while heat is being applied uniformly to the pipes 36 and 38 from a source outside the pipes 36 and 38. It can be seen at 48 that delivery means 26 has expanded radially, forcing tubular liner means 22 toward the inside surface of pipe 36. Liner means 22 is a flexible corrosion resistant material preferably made from crosslinked polymeric material, as will be discussed in further detail later, which is deformed by delivery means 26. Liner means 22 is deformable but not flowable when heated. Bonding means 24 becomes flowable when heated and moves by the radial expansion of the frusto-conical shape of delivery means 26 into contact with the inside wall of the pipe 36 and will flow progressively between liner means 22 and the inside pipe wall, again as shown at 48. Delivery means 26 in its radial expansion essentially "pumps" the bonding means 24 in a single wave-like fashion thereby precluding the entrapment of air. This phenomenon can be clearly seen in FIGS. 9 and 10. FIG. 9 illustrates in greater detail the wave-like configuration of bonding means 24 at point 48 prior to its intimate contact with back-up ring 40. FIG. 10 illustrates further movement of bonding means 24 which has precluded entrapment of air in the vicinity of the back-up ring 40. It can be seen that the extra material 30 discussed earlier is used in the vicinity of the backing ring 40 as filler. Extra material 28 as shown in FIG. 1 likewise provides an important first body of bonding material 24 at the beginning of the expansion process. Again, FIG. 10 illustrates at 50 the void-free encapsulation of the weld back-up ring 40 or, likewise any similar internal regularities on the inside surface of the pipe.

FIG. 5 illustrates device 20 after heating is completed and device 20 has expanded to provide a corrosion resistant area which overlaps corrosion resistant material 44 on pipes 36 and 38.

FIG. 6-8 illustrate the specific configurations of the preferred embodiment and an alternate embodiment of the delivery means 26. Delivery means 26 comprises a compressed cage-like member of high modulus engineering plastic. The specific configuration or pattern of slots 52 and webs 54 are arranged in an interlocking array of lever arms which provide means for amplifying the available motion of the spring-like material. FIGS. 6 and 7 illustrate alternative web and slot configurations in a compressed i.e., unrecovered condition. FIG. 8 illustrates delivery means 26 in an expanded i.e. recovered condition. The particular patterns illustrated in FIGS. 6 and 7 allow the lattice work structure to be compressed or reduced by as much as 25% to 75% in direction 56. Stated another way, the patterns illustrated in FIGS. 6 and 7 allow for the delivery means to expand some 50% to 300% in direction 56 depending upon slot and web thicknesses. The cconfiguration of FIG. 8 when used in a generally cylindrical configuration, as illustrated in FIG. 2, can be deformed into the configuration of FIGS. 1 and 6 to ¼-¾ of its original diameter.

The delivery means 26 is unique in that it amplifies the motion available from materials. A significant degree of motion is essential to provide product clearance over internal pipe surface irregularities and the weld back-up ring during installation. The delivery means in an open cage-like structure consisting of slots of various geometries connected by fingers of material which function as bending beams. The multiplicity of beams spaced apart by slot areas provides the means for amplifying the recovery motion. FIG. 7 illustrates a section of deformed delivery means which when recovered, will consist of straight sided slots as illustrated in FIG. 6. FIG. 6 shows a section of deformed delivery means which when recovered will consist of diamond shaped slots as shown in FIG. 8. The amount of recoverable motion available is primarily a function of slot width, beam width, beam length, and the amount of bending strain per beam. These variables can be balanced in various combinations to yield similar or identical performance.

FIGS. 6-8 show that the driver means 26 may be coated with a protective coating 58. This material 58 may be the same material used in liner means 22. It is understood that the high modulus engineering plastic is corrosion resistant, however, a protective coating 58 will provide further corrosion resistance and may facilitate bonding of the liner means to the delivery means as will be discussed later.

FIGS. 11-14 illustrate alternative configurations of a delivery means within the scope of the instant invention. FIG. 11 illustrates a delivery means and overall device configuration which is generally barrel-shaped. This configuration will likewise expand progressively upon uniform heating to in turn progressively secure a corrosion-resistant liner means by pumping a wave of a bonding material, but will do so in two substantially opposite directions rather than in one.

FIG. 12 illustrates a second alternative embodiment of the delivery means which comprises opposed frustroconical sections which will likewise move a wave of bonding means material in two directions.

FIG. 13 illustrates a third alternative embodiment of the delivery means which is generally bell shaped having a gradually sloped contour which will distribute the bonding means substantially in the manner of the device illustrated in FIGS. 1-5.

FIG. 14 illustrates an initially generally cylindrical fourth alternate embodiment of the delivery means which can be altered in shape into embodiments shown in FIGS. 1-5, 11, 12 or 13 by a programmed heating.

Programmed heating consists of sequentially heating specific zones of the pipe corresponding to specific locations on the device for a specified time. By doing this the device can be recovered progressively as the different zones are heated. This affords in situ the conical shape which imparts the pumping action to the bonding means, preventing void formation.

FIGS. 15, 16 & 17 illustrates the use of programmed heating with an initially cylindrical part. Of course the heating zones may be sequenced differently to provide products which expand as do the other shapes shown in FIGS. 11 through 13.

Progressive recovery of the device can be achieved in several different ways. The liner means could be selectively cross-linked along its axial length which is believed to create a varying softening point along its axial length. This would manifest itself during installation of a cylindrical device with uniform heating in a progressive recovery as discussed above. The same effect could be achieved by varying the liner and/or bonding means thickness along the devices axial length. Thicker sections of the liner means would retard or delay recovery of the device locally to impart a progressive recovery mode. Varying bonding means thickness would cause the part to contact the pipe wall first where the bonding means is thickest. This would start the pumping wave and cause said bonding means to flow progressively.

It is desirable that the delivery means be bonded to the liner means, as this (a) provides additional strength and helps prevent buckling of the delivery means prior to installation, and (b) minimizes the tendency of the liner means to split during the expansion of the delivery means. This bonding may be achieved with suitable adhesives.

The incorporation of high modulus engineering plastics into the instant invention as a delivery means is desirable from the standpoint that most inorganic materials do not possess the required high yield elongations, $\geq 4\%$ that insures necessary clearance, pipe tolerance accomodation, and bonding means flow characteristics for proper functioning of the device. In general, these engineering materials have a combination of properties that allows considerable amplified motion by the specific cage configuration and sufficient force to deform the liner means at its melting point. A yield elongation of approximately 4% at ambient conditions thru the melting point of the liner means; and a Young's modulus of $\geq 3 \times 10^5$ psi at the melting point of the liner means are the requisite properties of the delivery means. However, it is apparent to one skilled in the art that a number of factors such as the thickness and Young's modulus of the liner material and the specific cage configuration employed can cause the requirements to vary somewhat. The engineering plastics can be non-reinforced polymers such as poly(amide/imide) copolymers, reinforced thermoplastics such as nylons, polyesters, and polyarylenes or thermosetting resins. As apparent to those skilled in the art a number of reinforcing materials can be used such as short or continuous fibers of glass, graphite or alumina. Levels of these reinforcing materials are generally in the range of 20 to 40% by weight.

Typical Engineering Plastics

| Material | Typical Engineering Plastics | |
|---|---|---|
| | Modulus @ Temp. | Yield Elongation @ 23° C. |
| Torlon ™ 4203* | 500,000 @ 170° C. | 10% |
| Envex ™ 1000* | 320,000 @ 170° C. | 10% |
| Upjohn ™ 2080* | 310,000 @ 170° C. | 10% |

*Torlon ™ 4203 is a poly (amide/imide) commercially available from Amoco Oil Company
*Envex ™ 1000 is a polyimide commercially available from Rodgers Chemical Company
*Upjohn ™ 2080 is a polyimide commercially available from the Upjohn Company As an example a liner means constructed from 0.020" thick high density polyethylene with a melting point of approximately 130° C. and a hot modulus of 10 psi @ 150° C. can be used to internally protect a girth weld on a 4" diameter pipe from the action of corrosive media which are transported inside, when a suitable adhesive or bonding means and a cage like delivery means fabricated from poly(amide/imide) are employed.

Pressure generated by the delivery means:

$$P_o = \frac{\pi \Delta d}{n} \left( \frac{Eth^3}{r(L + W)L^3} \right)$$

where
- $\Delta d$ = difference between free recovery diameter and installed diameter of delivery means
- $n$ = number of elements in delivery means
- $t$ = thickness
- $E$ = Modulus of Elasticity
- $r$ = nominal pipe radius
- $h$ = beam width
- $W$ = axial distance between beams
- $L$ = beam length Pressure necessary to deform liner means:

$$P_L = \frac{Et\epsilon}{r}$$

where
- $E$ = Modulus of Elasticity
- $t$ = thickness
- $\epsilon$ = % deformation during expansion
- $r$ = smallest inital radius of liner $$P_o = \frac{\pi(.75)}{60} \left( \frac{(4 \times 10^5)(.125)^3(.075)}{2(.885 + .2600)(.885)^3} \right) = 1.45 \text{ lbs/in}^2$$

$$P_L = \frac{(.020)(10)(.25)}{2} = .03 \text{ lbs/in}^2$$

The material of the liner means should possess several characteristics. It should be electrically non-conductive, to prevent galvanic action. It should be solid to a temperature above the maximum operating temperature of the pipe, but should be easily deformable below about 200° C., by the delivery means to facilitate installation. It should, of course, be resistant to the materials it will encounter in service, such as hot saline water, H₂S, hydrocarbons, etc. It should be relatively impermeable to liquids and gases, to reduce pressurization of any void area between the liner means and the pipe wall. For optimum installation, the material should be easily deformable by the delivery means somewhat below 200° C., as stated above, but the material should be thermally stable to temperatures substantially greater than that, say 250° C. for at least about ½ hour, so that little or no damage, to it will occur if the pipe is overheated. It should be capable of good bonding to the adhesive chosen and also to the high modulus engineering plastic. Although the liner means may be elastomeric or thermoplastic, it is necessary that it should not melt and flow during installation, but merely soften, so that it retains its integrity and forces the bonding means into contact with the pipe wall. This may be achieved by crosslinking the material of the liner means, such as by the use of chemical cross-linking or by irradiation. An especially suitable material is cross-linked poly (vinylidene fluoride), which polymer has a melting point of about 170° C. If a poly(vinylidene fluoride) sleeve is used as the liner means, the delivery means may also be coated with poly(vinylidene fluoride) by a known process such as electrostatic powder spraying, followed by fusion and cross-linking. The liner means and delivery means may then easily be attached to each other by heat-welding.

Up to the softening point of a thermoplastic or cross-linked thermoplastic liner means the hoop stress of the delivery means is less than that of the liner means and therefore is constrained by said liner means. At the liner means softening point its strength drops off rapidly with increasing temperature relative to that of the delivery means. Consequently the strength of the liner means becomes lower than the hoop stress exerted by the delivery means. As this happens the liner means is forced to expand against the pipe wall. It is also possible that the delivery means may exhibit reduced force or strength as the temperature is increased provided that the delivery means is stronger than the liner means at the softening point of the liner means. An elastomeric liner means may be substituted for a thermoplastic or cross-linked thermoplastic liner means if it is provided with a suitable thermally activated constraining device to prevent its expansion by creep. Such a thermally activated constraining device might consist of bands of a thermoplastic material functioning as described above. Alternately the bonding means itself might serve as a thermally activated constraining device.

The material of the bonding means is also subject to certain constraints. First it should be capable of adhesion to the material of the liner means, to the internal coating of the pipe (usually an epoxy layer), and to the weld area, i.e. to both clean and dirty steel. Second, at the installation temperature, it should be sufficiently flowable that it will readily be spread along the region covered by the device, leaving no voids. A suitable viscosity range at installation temperature is from about $10^2$ $10^6$ poise. Third, the material should be thermally stable to above the maximum installation temperature, and it is especially desirable that it not produce gases if overheated since that could induce voids. Fourth, the material should be chemically stable under the pipe operating environment conditions, especially it must be hydrolytically stable.

Particularly suitable bonding means are disclosed in the commonly assigned application of Rinde, Glover and Lopez, Ser. No. 173,946, filed July 31, 1980, the disclosure of which is incorporated herein by reference.

Two principal types of adhesive are suitable for use—thermosets and thermoplastics. Thermosets include, for example, epoxies, melamines, urethanes, and phenolic resins. It is desirable that a thermoset should have a cure temperature near the expected installation temperature (about 200° C.). While a lower temperature would be possible.

What is claimed is:

1. A device for protecting the inside of a pipe, the pipe comprising a cylindrical member, said device comprising:
   a radially compressed, tubular delivery means of high modulus engineering plastic, said delivery means being generally frustro-conical in shape and having a radially continuous sidewall which is cage-like with a plurality of slots therein, said delivery means being flexible in both radial and axial directions;
   tubular liner means outside of and in contact with said delivery means to radially constrain said delivery means, said liner means being generally frustro-conical in shape, corrosion resistant and being softenable and deformable substantially only radially upon application of heat; and bonding means outside of and in contact with said liner means to bond said liner means to the inside surface of a cylindrical pipe, said bonding means being flowable and activated by application of heat, said delivery means expanding radially when said liner means has been softened through the application of heat uniformly along the length of the device, the radial expansion of the frustro-conical shape delivery and liner means causing said bonding means to flow progressively axially along the outer surface of said liner means to preclude air entrapment between said liner means and the inside of a cylindrical pipe.

2. A device for protecting the inside of a pipe, the pipe comprising a cylindrical member, said device comprising:

a radially compressed, tubular delivery means of high modulus engineering plastic, said delivery means being generally barrel-shaped and having a radially continuous sidewall which is cage-like with a plurality of slots therein, said delivery means being flexible in both radial and axial directions;

tubular liner means outside of and in contact with said delivery means to radially constrain said delivery means, said liner means being generally barrel-shaped, corrosion resistant and being softenable and deformable substantially only radially upon application of heat; and bonding means outside of and in contact with said liner means to bond said liner means to the inside surface of a cylindrical pipe, said bonding means being flowable and activated by application of heat, said delivery means expanding radially when said liner means has been softened through the application of heat uniformly along the length of the device, the radial expansion of the barrel-shaped delivery and liner means causing said bonding means to flow progressively axially along the outer surface of said liner means to preclude air entrapment between said liner means and the inside of a cylindrical pipe.

3. A device for protecting the inside of a pipe, the pipe comprising a cylindrical member, said device comprising:

a radially compressed, tubular delivery means of high modulus engineering plastic, said delivery means being generally bell-shaped and having a radially continuous sidewall which is cage-like with a plurality of slots therein, said delivery means being flexible in both radial and axial directions;

tubular liner means outside of and in contact with said delivery means to radially constrain said delivery means, said liner means being generally bell-shaped, corrosion resistant and being softenable and deformable substantially only radially upon application of heat; and bonding means outside of and in contact with said liner means to bond said liner means to the inside surface of a cylindrical pipe, said bonding means being flowable and activated by application of heat, said delivery means expanding radially when said liner means has been softened through the application of heat uniformly along the length of the device, the radial expansion of the bell-shaped delivery and liner means causing said bonding means to flow progressively axially along the outer surface of said liner means to preclude air entrapment between said liner means and the inside of a cylindrical pipe.

4. A device for protecting the inside of a pipe, the pipe comprising a cylindrical member, said device comprising:

a radially compressed, tubular delivery means of high modulus engineering plastic, said delivery means having a radially continuous sidewall which is cage-like with a plurality of slots therein, said delivery means being flexible in both radial and axial directions, said delivery means having axially progressive radial expansion means;

tubular liner means outside of and in contact with said delivery means to radially constrain said delivery means, said liner means being corrosion resistant and being softenable and deformable substantially only radially upon application of heat; and bonding means outside of and in contact with said liner means to bond said liner means to the inside surface of a cylindrical pipe, said bonding means being flowable and activated by application of heat, said delivery means expanding radially when said liner means has been softened through the application of heat along the length of the device, the radial expansion of the delivery means and liner means causing the bonding means to progressively contact the inside of a cylindrical pipe and to flow progressively axially along the outer surface of said liner means to preclude air entrapment between said liner means and the inside of a cylindrical pipe.

5. A device as in claims 1, 2, 3, or 4 wherein the liner means comprises a crosslinked polymeric material, said liner means radially constraining said delivery means before heat is applied to said device.

6. A device as in claim 5 wherein said bonding means and said liner means comprise an integral layer of polymeric material, said liner means defining an inside region of said layer which is substantially crosslinked an said bonding means defining an outside region which is substantially non-crosslinked.

7. A device as in claims 1, 2, 3, or 4 further comprising a positioning means contacting said device to move said device from a remote position to an activating position where said device is heated and thus expanded.

8. A device as in claims 1, 2, 3, or 4 wherein said delivery means is bonded to said liner means.

* * * * *